United States Patent
Lee et al.

(10) Patent No.: US 7,161,988 B2
(45) Date of Patent: Jan. 9, 2007

(54) METHOD AND APPARATUS FOR MINIMIZING CO-CHANNEL INTERFERENCE

(75) Inventors: Lin-Nan Lee, Potomac, MD (US); Feng-Wen Sun, Germantown, MD (US); Adam Von Ancken, New Market, MD (US)

(73) Assignee: The DirecTV Group, Inc., El Segundo, CA (US)

( * ) Notice: Subject to any disclaimer, the term of this patent is extended or adjusted under 35 U.S.C. 154(b) by 33 days.

(21) Appl. No.: 11/009,346

(22) Filed: Dec. 10, 2004

(65) Prior Publication Data

US 2006/0153313 A1    Jul. 13, 2006

Related U.S. Application Data

(60) Provisional application No. 60/561,418, filed on Apr. 12, 2004.

(51) Int. Cl.
*H04B 15/00* (2006.01)
*H04K 1/02* (2006.01)
*H03K 5/01* (2006.01)
*H04J 11/00* (2006.01)

(52) U.S. Cl. .................. 375/285; 375/260; 375/296; 375/346; 370/208

(58) Field of Classification Search ............ 375/260, 375/130, 146, 140, 141, 285, 295, 296, 316, 375/346, 144, 147, 148; 370/335, 342, 441, 370/208; 725/31; 380/210, 268, FOR. 109
See application file for complete search history.

(56) References Cited

U.S. PATENT DOCUMENTS

| | | | |
|---|---|---|---|
| 5,327,455 A | 7/1994 | De Gaudenzi et al. | |
| 6,154,454 A * | 11/2000 | Abe | 370/335 |
| 6,201,798 B1 * | 3/2001 | Campanella et al. | 370/326 |
| 2002/0172264 A1 | 11/2002 | Wlberg et al. | |
| 2005/0226414 A1 * | 10/2005 | Lee et al. | 380/210 |
| 2005/0226418 A1 * | 10/2005 | Lee et al. | 380/233 |
| 2005/0229230 A1 * | 10/2005 | Santoru et al. | 725/126 |

* cited by examiner

*Primary Examiner*—Tesfaldet Bocure

(74) *Attorney, Agent, or Firm*—Georgann S. Grunebach

(57) ABSTRACT

An approach is provided for minimizing co-channel interference in a communication system is disclosed. A header of a first frame is scrambled based on a first unique word. A header of a second frame is scrambled based on a second unique word. The first frame including the corresponding scrambled header and the second frame including the corresponding scrambled header are transmitted, respectively, over adjacent co-channels of the communication system. Each of the frames further includes a payload and a pilot block. The payload and the pilot block of the first frame are scrambled based on a first scrambling sequence. The payload and the pilot block of the second frame are scrambled based on a second scrambling sequence. The above arrangement is particularly suited to a digital satellite broadcast and interactive system.

37 Claims, 14 Drawing Sheets

FIG. 13

| Seq. #(n) | 0 | 189063 | 153751 | 238776 | 62994 | 95552 | 2553 | 227369 | 26392 | 214455 | 51921 | 208647 | 27314 | 104754 | 76683 | 146239 | 96364 |
|---|---|---|---|---|---|---|---|---|---|---|---|---|---|---|---|---|---|
| 0 | 0.00 | -3.65 | -3.48 | -3.45 | -3.49 | -3.57 | -3.45 | -3.49 | -3.23 | -2.98 | -3.49 | -3.14 | -3.00 | -3.00 | -3.57 | -3.32 | -3.19 |
| 189063 | -3.65 | 0.00 | -3.14 | -3.45 | -2.98 | -3.32 | -3.45 | -3.52 | -3.49 | -3.39 | -3.57 | -3.26 | -3.25 | -3.39 | -3.00 | -3.57 | -3.08 |
| 153751 | -3.48 | -3.14 | 0.00 | -3.13 | -3.14 | -3.00 | -3.24 | -3.73 | -3.19 | -3.19 | -3.62 | -3.37 | -2.92 | -3.48 | -3.09 | -3.14 | -3.32 |
| 238776 | -3.45 | -3.45 | -3.13 | 0.00 | -3.23 | -2.85 | -3.14 | -3.14 | -3.06 | -3.24 | -3.23 | -3.65 | -2.92 | -2.91 | -3.13 | -3.25 | -2.87 |
| 62994 | -3.49 | -2.98 | -3.14 | -3.23 | 0.00 | -3.14 | -3.37 | -2.92 | -3.72 | -3.00 | -3.24 | -3.41 | -3.37 | -3.01 | -2.78 | -3.25 | -3.27 |
| 95552 | -3.57 | -3.32 | -3.00 | -2.85 | -3.14 | 0.00 | -3.23 | -3.09 | -2.92 | -3.32 | -3.62 | -3.57 | -3.57 | -3.14 | -3.06 | -3.00 | -3.13 |
| 2553 | -3.45 | -3.45 | -3.24 | -3.14 | -3.37 | -3.23 | 0.00 | -3.00 | -3.00 | -3.65 | -3.45 | -3.26 | -3.09 | -3.63 | -3.45 | -3.26 | -3.25 |
| 227369 | -3.49 | -3.52 | -3.73 | -3.14 | -2.92 | -3.09 | -3.00 | 0.00 | -3.26 | -2.91 | -2.82 | -3.21 | -3.25 | -3.21 | -3.00 | -3.00 | -3.00 |
| 26392 | -3.23 | -3.49 | -3.19 | -3.06 | -3.72 | -2.92 | -3.00 | -3.26 | 0.00 | -3.45 | -3.57 | -3.19 | -3.37 | -3.14 | -3.57 | -3.32 | -3.39 |
| 214455 | -2.98 | -3.39 | -3.19 | -3.24 | -3.00 | -3.32 | -3.65 | -2.91 | -3.45 | 0.00 | -3.32 | -3.27 | -3.45 | -3.39 | -3.45 | -3.65 | -3.08 |
| 51921 | -3.49 | -3.57 | -3.62 | -3.23 | -3.24 | -3.62 | -3.45 | -2.82 | -3.57 | -3.32 | 0.00 | -3.35 | -3.37 | -3.24 | -3.09 | -3.26 | -3.01 |
| 208647 | -3.14 | -3.26 | -3.37 | -3.65 | -3.41 | -3.57 | -3.26 | -3.21 | -3.19 | -3.27 | -3.35 | 0.00 | -3.08 | -3.52 | -3.45 | -3.63 | -3.25 |
| 27314 | -3.00 | -3.25 | -2.92 | -2.92 | -3.37 | -3.57 | -3.09 | -3.25 | -3.37 | -3.45 | -3.37 | -3.08 | 0.00 | -2.92 | -3.39 | -2.98 | -3.24 |
| 104754 | -3.00 | -3.39 | -3.48 | -2.91 | -3.01 | -3.14 | -3.63 | -3.21 | -3.14 | -3.39 | -3.24 | -3.52 | -2.92 | 0.00 | -3.39 | -2.91 | -3.14 |
| 76683 | -3.57 | -3.00 | -3.09 | -3.13 | -2.78 | -3.06 | -3.45 | -3.00 | -3.57 | -3.45 | -3.09 | -3.45 | -3.39 | -3.37 | 0.00 | -3.35 | -3.65 |
| 146239 | -3.32 | -3.57 | -3.14 | -3.25 | -3.25 | -3.00 | -3.26 | -3.00 | -3.32 | -3.65 | -3.26 | -3.63 | -2.98 | -2.91 | -3.35 | 0.00 | -2.95 |
| 96364 | -3.19 | -3.08 | -3.32 | -2.87 | -3.27 | -3.13 | -3.25 | -3.00 | -3.39 | -3.08 | -3.01 | -3.25 | -3.24 | -3.14 | -3.65 | -2.95 | 0.00 |

FIG. 14

| Seed | 13 | 53 | 70 | 74 | 126 | 159 | 179 | 216 | 236 | 238 | 244 | 262 | 278 | 536 | 628 | 737 | 771 |
|---|---|---|---|---|---|---|---|---|---|---|---|---|---|---|---|---|---|
| 13 | 0.00 | -3.37 | -3.21 | -3.37 | -3.26 | -3.24 | -3.14 | -3.23 | -3.63 | -3.48 | -3.14 | -3.52 | -3.14 | -3.23 | -3.41 | -3.39 | -3.37 |
| 53 | -3.37 | 0.00 | -3.06 | 0.00 | -3.25 | -3.27 | -3.49 | -3.51 | -3.62 | -3.57 | -3.24 | -3.04 | -3.26 | -3.25 | -3.49 | -3.63 | -3.24 |
| 70 | -3.21 | -3.06 | 0.00 | -3.13 | -3.26 | -3.25 | -3.19 | -3.49 | -3.84 | -3.35 | -3.27 | -3.25 | -3.26 | -3.39 | -3.45 | -3.00 | -3.51 |
| 74 | -3.37 | -3.13 | -3.74 | 0.00 | -3.37 | -3.00 | -3.25 | -3.14 | -3.26 | -3.45 | -3.57 | -3.37 | -3.04 | -3.37 | -3.26 | -3.04 | -3.65 |
| 126 | -3.26 | -3.25 | -3.26 | -3.37 | 0.00 | -3.26 | -3.49 | -3.09 | -3.08 | -3.48 | -3.26 | -3.14 | -3.26 | -3.32 | -3.49 | -3.49 | -3.19 |
| 159 | -3.24 | -3.27 | -3.25 | -3.00 | -3.26 | 0.00 | -3.24 | -3.09 | -3.23 | -3.00 | -3.45 | -3.21 | -3.23 | -3.39 | -3.32 | -3.24 | -3.48 |
| 179 | -3.14 | -3.49 | -3.19 | -3.25 | -3.49 | -3.24 | 0.00 | -2.92 | -3.49 | -3.25 | -3.01 | -3.14 | -3.49 | -3.49 | -3.14 | -3.41 | -3.39 |
| 216 | -3.23 | -3.51 | -3.49 | -3.14 | -3.09 | -3.09 | -2.92 | 0.00 | -3.32 | -3.49 | -3.00 | -3.48 | -3.32 | -3.51 | -3.45 | -3.49 | -3.25 |
| 236 | -3.63 | -3.62 | -3.84 | -3.26 | -3.08 | -3.23 | -3.49 | -3.32 | 0.00 | -3.25 | -3.04 | -3.48 | -3.24 | -3.45 | -2.92 | -3.57 | -3.26 |
| 238 | -3.48 | -3.57 | -3.35 | -3.45 | -3.48 | -3.00 | -3.25 | -3.49 | -3.25 | 0.00 | -3.00 | -3.48 | -3.26 | -3.39 | -3.35 | -3.49 | -3.45 |
| 244 | -3.14 | -3.24 | -3.27 | -3.57 | -3.26 | -3.45 | -3.01 | -3.00 | -3.04 | -3.00 | 0.00 | -3.09 | -3.13 | -3.39 | -3.26 | -3.27 | -2.95 |
| 262 | -3.52 | -3.04 | -3.25 | -3.37 | -3.14 | -3.21 | -3.14 | -3.48 | -3.48 | -3.48 | -3.09 | 0.00 | -3.08 | -3.00 | -3.74 | -3.57 | -3.19 |
| 278 | -3.14 | -3.26 | -3.26 | -3.04 | -3.26 | -3.23 | -3.49 | -3.32 | -3.24 | -3.26 | -3.13 | -3.08 | 0.00 | -3.63 | -3.26 | -3.14 | -3.35 |
| 536 | -3.23 | -3.25 | -3.39 | -3.37 | -3.32 | -3.39 | -3.49 | -3.51 | -3.45 | -3.39 | -3.39 | -3.00 | -3.63 | 0.00 | -3.51 | -3.19 | -3.14 |
| 628 | -3.41 | -3.49 | -3.45 | -3.26 | -3.49 | -3.32 | -3.14 | -3.45 | -2.92 | -3.35 | -3.26 | -3.74 | -3.26 | -3.51 | 0.00 | -3.52 | -3.26 |
| 737 | -3.39 | -3.63 | -3.00 | -3.04 | -3.49 | -3.24 | -3.41 | -3.49 | -3.57 | -3.49 | -3.27 | -3.57 | -3.14 | -3.19 | -3.52 | 0.00 | -3.26 |
| 771 | -3.37 | -3.24 | -3.51 | -3.65 | -3.19 | -3.48 | -3.39 | -3.25 | -3.26 | -3.45 | -2.95 | -3.19 | -3.35 | -3.14 | -3.26 | -3.26 | 0.00 |

METHOD AND APPARATUS FOR MINIMIZING CO-CHANNEL INTERFERENCE

RELATED APPLICATIONS

This application claims the benefit of the earlier filing date under 35 U.S.C. § 119(e) of U.S. Provisional Application Ser. No. 60/561,418 filed Apr. 12, 2004, entitled "Co-channel Interference Mitigation for DVB-S2"; the entirety of which are incorporated herein by reference.

FIELD OF THE INVENTION

The present invention relates to communication systems, and more particularly to combating signal interference.

BACKGROUND OF THE INVENTION

Broadcast systems have embraced the demand for high quality transmissions made possible by digital technology. The digital revolution has transformed the delivery of broadband services, including audio and video programming as well as data transmission. Satellite communication systems have emerged as a viable solution for supporting such broadband services. As such, power and bandwidth efficient modulation and coding are highly desirable for satellite communications systems to provide reliable communication across noisy communication channels. Receiver performance is negatively impacted by co-channel interference. Such interference occurs largely from frequency-reuse, as spectral allocation of frequencies is finite and expensive. In practical applications, the co-channel interference may stem from transmission of other system operators, a satellite operating in adjacent orbital slots, or other spot beams in a spot beam satellite system.

Traditionally, the negative effects of co-channel interference have been minimized by redesigning the frequency assignments or altering (by upgrading) the transmission facilities to confine the spreading of the signals. These approaches require significant engineering investments (assuming that a technical solution is even possible); this necessarily entails significant costs.

Therefore, there is a need for a communication system that minimizes co-channel interference without requiring substantial system redesign.

SUMMARY OF THE INVENTION

These and other needs are addressed by the present invention, wherein an approach is provided for minimizing co-channel interference in a digital broadcast and interactive system. It is recognized that the cross-correlations between co-channel frames are periodic in nature. A header of a first frame is scrambled based on a first unique word (UW). A header of a second frame is scrambled based on a second unique word. The first frame including the corresponding scrambled header and the second frame including the corresponding scrambled header are transmitted, respectively, over adjacent co-channels of the communication system. Each of the frames further includes a payload and a pilot block. The payload and the pilot block of the first frame are scrambled based on a first scrambling sequence. The payload and the pilot block of the second frame are scrambled based on a second scrambling sequence. Information associated with the unique words and the scrambling sequences are transmitted over a default carrier to a receiver within the communication system. The scrambling sequences, according to one embodiment of the present invention, are based on Gold sequences. The above arrangement advantageously reduces the impact of co-channel interference, thereby enhancing receiver performance.

According to one aspect of an embodiment of the present invention, a method for minimizing co-channel interference in a communication system is disclosed. The method includes scrambling a header of a first frame based on a first unique word; and scrambling a header of a second frame based on a second unique word. The first frame including the corresponding scrambled header and the second frame including the corresponding scrambled header are transmitted, respectively, over adjacent co-channels of the communication system.

According to another aspect of an embodiment of the present invention, an apparatus for minimizing co-channel interference in a communication system is disclosed. The apparatus includes a scrambler configured to scramble a header of a first frame based on a first unique word, and to scramble a header of a second frame based on a second unique word. The first frame including the corresponding scrambled header and the second frame including the corresponding scrambled header are transmitted, respectively, over adjacent co-channels of the communication system.

According to another aspect of an embodiment of the present invention, a method of communicating is disclosed. The method includes tuning to a default carrier to receive scrambling information. The scrambling information includes a unique word and a scrambling sequence corresponding to a particular carrier among a plurality of adjacent carriers. The unique word and the scrambling sequence are selected to minimize co-channel interference with respect to the adjacent carriers. The method also includes tuning to the particular carrier for receiving a scrambled frame including a header, a payload, and a pilot block. Further, the method includes descrambling the header with the unique word; and descrambling the payload and the pilot block with the scrambling sequence.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 13 and 14 are tables showing the worst-case cross-correlations of pilot-segments for each pair of co-channels for determining the initialization seeds of the m-generator of FIG. 7.

DESCRIPTION OF THE PREFERRED EMBODIMENT

An apparatus, method, and software for reducing co-channel interference in a digital broadcast and interactive system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
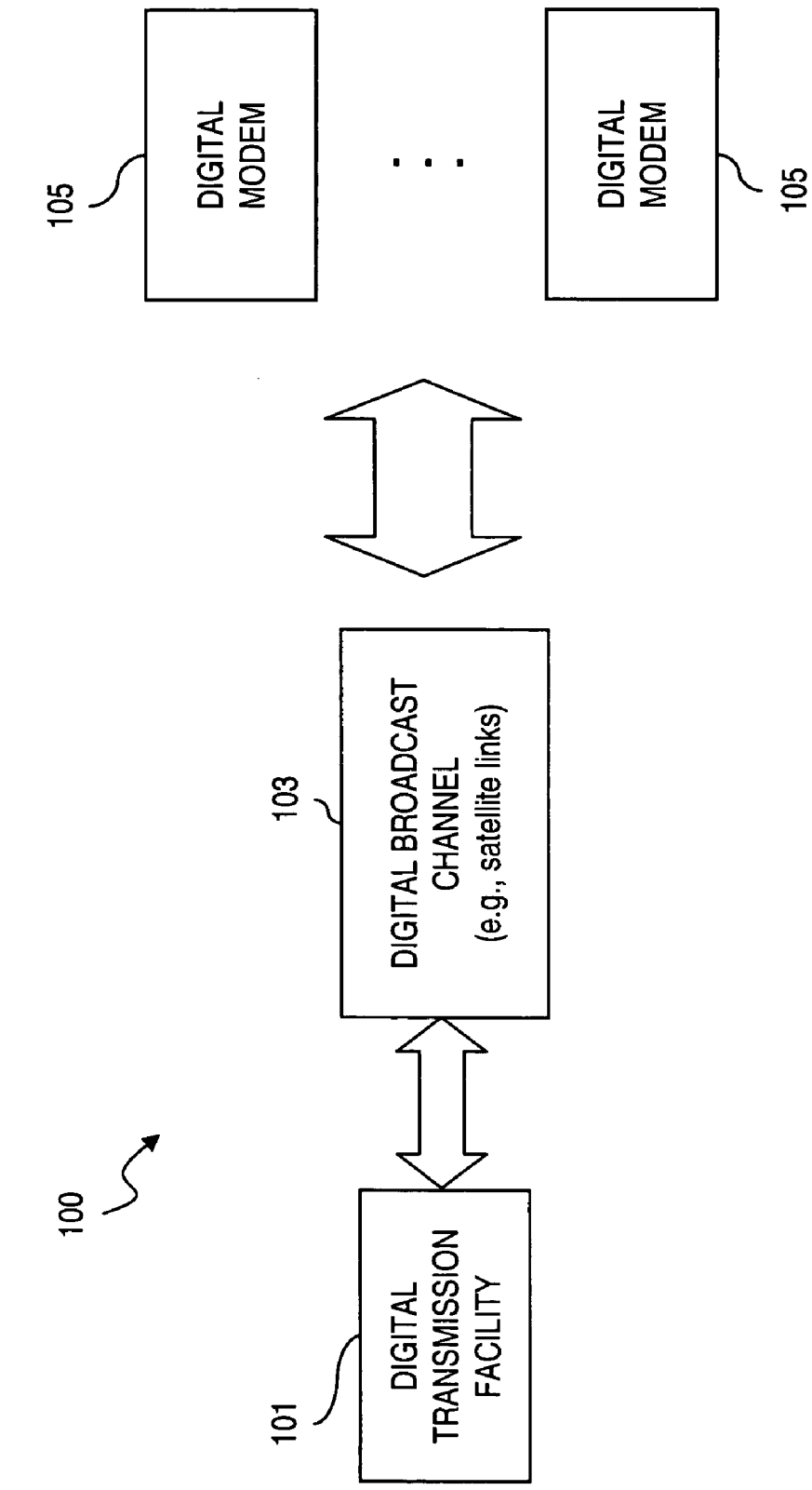
FIG. 1 is a diagram of a digital broadcast system capable of minimizing co-channel interference, according to an embodiment of the present invention.

FIG. 1 is a diagram of a digital broadcast system capable of minimizing co-channel interference, according to an embodiment of the present invention. The digital communications system 100 includes a digital transmission facility 101 that generates signal waveforms for broadcast across a communication channel 103 to one or more digital modems 105. According to one embodiment of the present invention, the communication system 100 is a satellite communication system that supports, for example, audio and video broadcast services as well as interactive services. Interactive services include, for example, electronic programming guides (EPGs), high-speed internet access, interactive advertising, telephony, and email services. These interactive services can also encompass such television services as Pay Per View, TV Commerce, Video On Demand, Near Video On Demand and Audio On Demand services. In this environment, the modems 105 are satellite modems.

In broadcast applications, continuous mode modems 105 are widely used. Codes that perform well in low signal-to-noise (SNR) environments are at odds with these modems with respect to synchronization (e.g., carrier phase and carrier frequency). Physical layer header and/or pilot symbols can be used for such synchronization. Accordingly, an important consideration with respect to system performance is that of co-channel interference on physical layer header and/or pilot symbols. Because physical layer header and/or pilots are used for acquiring and/or tracking carrier phase, carrier frequency, such interference can degrade receiver performance.

Conventional digital broadcast systems (not shown) require use of additional training symbols beyond that of the normal overhead bits in a frame structure for their synchronization processes. The increase in overhead is particularly required when the Signal-to-Noise (SNR) is low; such an environment is typical when high performance codes are used conjunction with high order modulation. Traditionally, continuous mode modems utilize a feedback control loop to acquire and track carrier frequency and phase. In this synchronization process, the FEC (Forward Error Correction) coded data fields, e.g., preambles of a block code, which contain known data symbols, are simply ignored. Such conventional approaches that are purely based on feedback control loops are prone to strong Radio Frequency (RF) phase noise and thermal noise, causing high cycle slip rates and an error floor on the overall receiver performance. Thus these approaches are burdened by increased overhead in terms of training symbols for certain performance target, in addition to limited acquisition range and long acquisition time. Further, these conventional synchronization techniques are dependent on the particular modulation scheme, thereby hindering flexibility in use of modulation schemes.

In the system 100 of FIG. 1, the modems 105 achieve carrier synchronization by examining the preambles and/or unique words (UW) that are embedded in broadcast data frame structures (shown in FIG. 4A), thereby reducing the use of additional overhead specifically designated for training purposes. The digital modems 105 are more fully described below with respect to FIG. 3.

In this discrete communications system 100, the transmission facility 101 produces a discrete set of possible messages representing media content (e.g., audio, video, textual information, data, etc.); each of the possible messages has a corresponding signal waveform. These signal waveforms are attenuated, or otherwise altered, by communications channel 103. To combat the noise channel 103, the transmission facility 101 utilizes Low Density Parity Check (LDPC) codes.

The LDPC codes that are generated by the transmission facility 101 enable high speed implementation without incurring any performance loss. These structured LDPC codes output from the transmission facility 101 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit any sign of error floor.

According to one embodiment of the present invention, the transmission facility 101 generates, using a relatively simple encoding technique as explained below in FIG. 2, LDPC codes based on parity check matrices (which facilitate efficient memory access during decoding) to communicate with the satellite modem 105.

Figure 2:
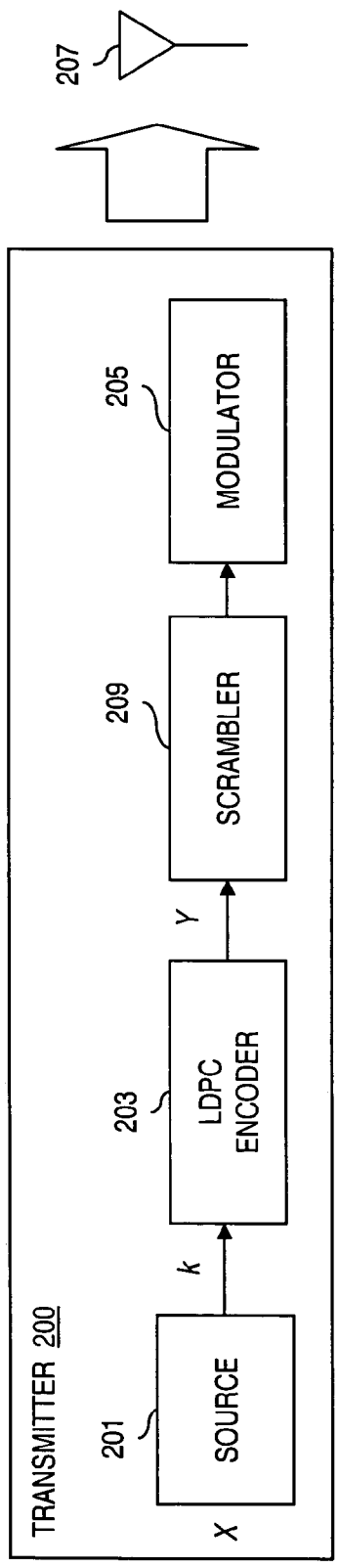
FIG. 2 is a diagram of an exemplary transmitter employed in the digital transmission facility of the system of FIG. 1.

FIG. 2 is a diagram of an exemplary transmitter employed in the digital transmission facility of the system of FIG. 1. A transmitter 200 is equipped with an LDPC encoder 203 that accepts input from an information source 201 and outputs coded stream of higher redundancy suitable for error correction processing at the receiver 105. The information source 201 generates k signals from a discrete alphabet, X. LDPC codes are specified with parity check matrices. On the other hand, encoding LDPC codes require, in general, specifying the generator matrices. Even though it is possible to obtain generator matrices from parity check matrices using Gaussian elimination, the resulting matrix is no longer sparse and storing a large generator matrix can be complex.

Encoder 203 generates signals from alphabet Y to a modulator 205 using a simple encoding technique that makes use of only the parity check matrix by imposing structure onto the parity check matrix. Specifically, a restriction is placed on the parity check matrix by constraining certain portion of the matrix to be triangular. Such a restriction results in negligible performance loss, and therefore, constitutes an attractive trade-off. The construction of such a parity check matrix is described more fully described in a co-pending patent application filed Jul. 3, 2003, and entitled, "Method and System for Providing Low Density Parity Check (LDPC) Encoding" (Ser. No. 10/613,823); the entirety of which is incorporated herein by reference.

Modulator 205 maps the encoded messages from encoder 203 to signal waveforms that are transmitted to a transmit antenna 207, which emits these waveforms over the communication channel 103. Accordingly, the encoded messages are modulated and distributed to a transmit antenna 207. The transmissions from the transmit antenna 207 propagate to a digital modem, as discussed below. In the case of a satellite communication system, the transmitted signals from the antenna 207 are relayed via a satellite. The transmitter 200 further includes a scrambler 209 for altering symbols for transmission as to minimize co-channel interference, as more fully described below.

Figure 3:
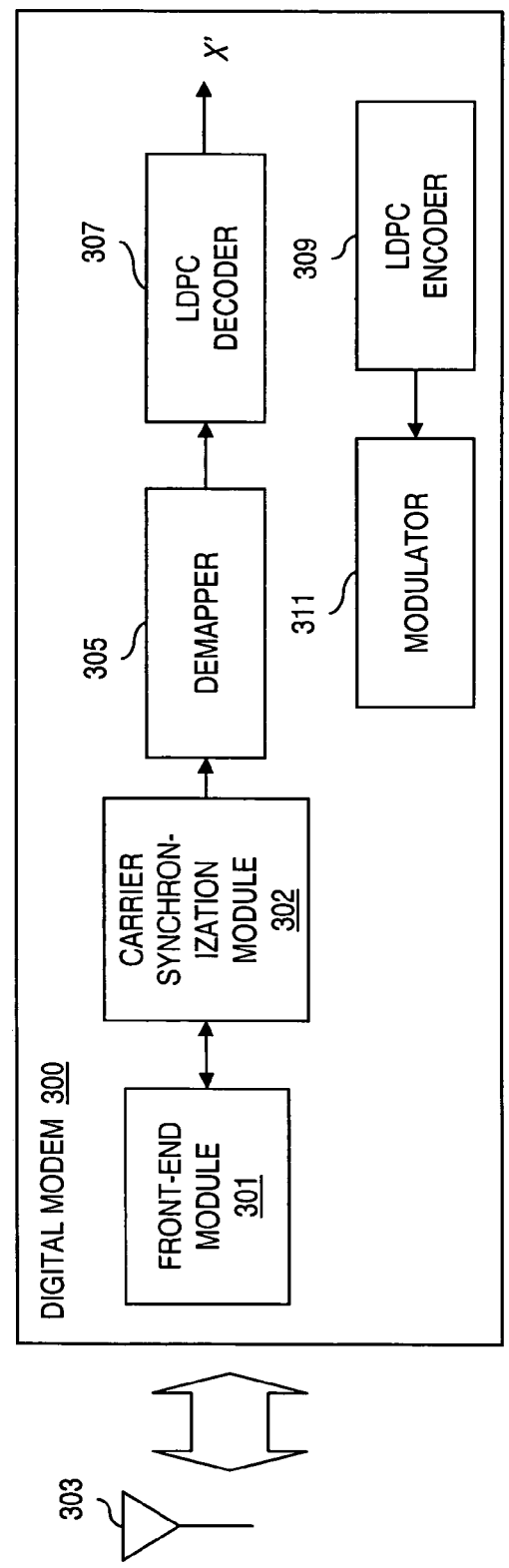
FIG. 3 is a diagram of an exemplary digital modem in the system of FIG. 1.

FIG. 3 is a diagram of an exemplary digital modem in the system of FIG. 1. The digital modem 300, as a modulator/demodulator, supports both transmission and reception of signals from the transmitter 200. According to one embodiment of the present invention, the modem 300 has a front-end module 301 that provides filtering and symbol timing synchronization of the LDPC encoded signals received from antenna 303, a carrier synchronization module 302 that provides frequency and phase acquisition and tracking of the signals output from the front-end module 301. A demapper 305 performs demapping of received signals output from the carrier synchronization module 302. After demodulation, the signals are forwarded to a LDPC decoder 307, which attempts to reconstruct the original source messages by generating messages, X'.

With respect to the receiving side, if both the desired and interfering carriers use the same modulation and coding configuration (or mode), when the frame header (shown in FIG. 4A) are aligned exactly in time while their relative frequency offset are small, the interference can cause significant errors in phase estimation for the demodulator. As a result, the demodulator can put out errors periodically. This condition occurs when frequency and symbol clock of the signals in question are sufficiently close, but drifting with respect to each other.

On the transmission side, the modem 300 utilizes a LDPC encoder 309 to encode input signals. The encoded signals are then modulated by a modulator 311, which can employ a variety of modulation schemes—e.g., Binary Phase Shift Keying (BPSK), Quadrature Phase Shift Keying (QPSK), 8PSK, 16 Amplitude Phase Shift Keying (APSK), 32APSK, a high order Quadrature Amplitude Modulation (QAM), or other high order modulation schemes.

Figure 4A:
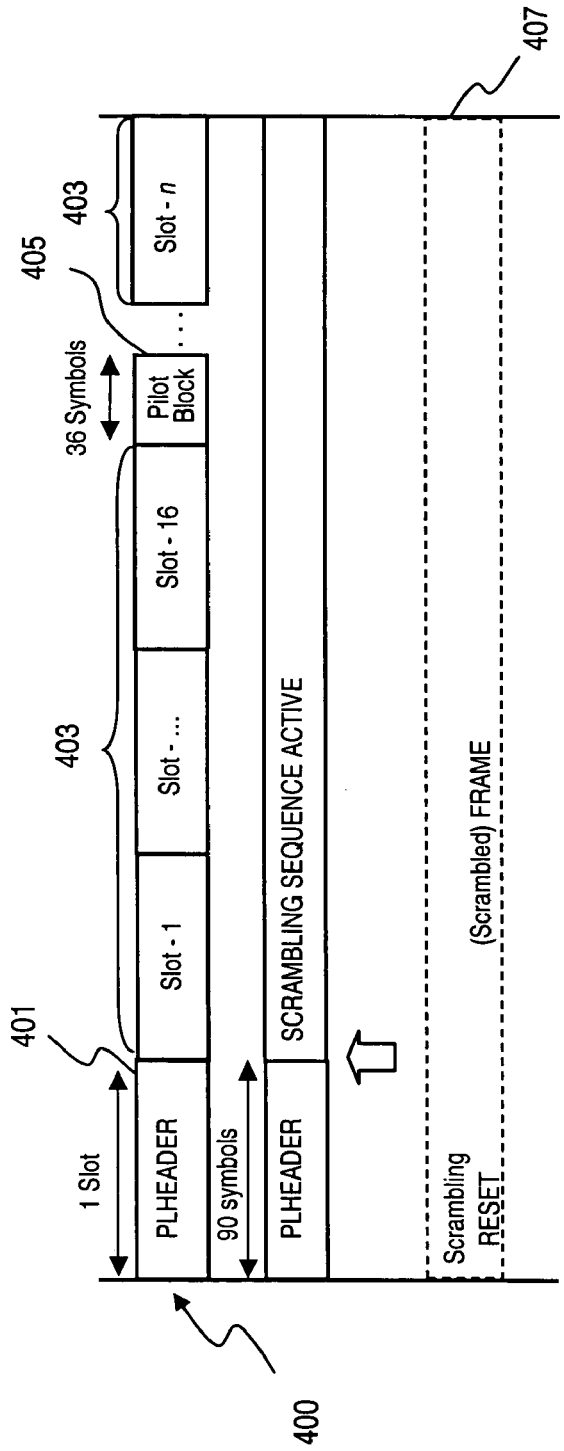
FIGS. 4A and 4B are diagrams, respectively, of a frame structure used in the system of FIG. 1, and of logic for scrambling the frame headers with different Unique Words (UWs) for respective frames transmitted over adjacent co-channels, in accordance with an embodiment of the present invention.

FIG. 4A is a diagram of an exemplary frame structure used in the system of FIG. 1. By way of example, an LDPC coded frame 400, which can support, for example, satellite broadcasting and interactive services, is shown. The frame 400 includes a Physical Layer Header (denoted "PLHEADER") 401 and occupies one slot, as well as other slots 403 for data or other payload. In addition, the frame 400, according to one embodiment of the present invention, utilizes a pilot block 405 to aid synchronization of carrier phase and frequency. It is noted that the pilot block 405 is optional, and is inserted via a pilot insertion process. Although shown after 16 slots 403, the pilot block (or pilot sequence) 405, which represents a Unique Word (UW), can be inserted anywhere along the frame 400.

In an exemplary embodiment, the pilot insertion process inserts pilot blocks every 1440 symbols. Under this scenario, the pilot block includes 36 pilot symbols. For instance, in the physical layer frame 400, the first pilot block is thus inserted 1440 symbols after the PLHEADER, the second pilot block is inserted after 2880 symbols, and etc. If the pilot block position coincides with the beginning of the next PLHEADER, then the pilot block is not inserted. The above pilot insertion process is further detailed in co-pending application, entitled "Method and Apparatus for Providing Carrier Synchronization in Digital Broadcast and Interactive Systems" (filed May 10, 2004; Ser. No. 10/842,325); which is incorporated herein in its entirety.

The carrier synchronization module 302 (FIG. 3), according to an embodiment of the present invention, utilizes the PLHEADER 401 and/or UWs 405 for carrier frequency and phase synchronization. As previously mentioned, conventionally, the FEC coded data, which contains known data symbols (e.g., the PLHEADER 401), are ignored in continuous mode modems. That is, the PLHEADER 401 and/or UWs 405 are used for carrier synchronization, i.e., for assisting with the operation of frequency acquisition and tracking, and phase tracking loop. As such, the PLHEADER 401 and UWs 405 are considered "training" or "pilot" symbols, and constitute, individually or collectively, a training block.

For 8PSK modulation, the pilot sequence 405 is a 36-symbol long segment (with each symbol being $(1+j)/\sqrt{2}$); that is, 36 symbols (PSK). In the frame 400, the pilot sequence 405 can be inserted after 1440 symbols of data. Under this scenario, the PLHEADER 401 can have 64 possible formats depending on the modulation, coding and pilot configuration.

As earlier mentioned, it is recognized that when the headers of the interfering carrier and the desired carrier (i.e., adjacent co-channels) are aligned in time, the coherent contribution from the interfering PLHEADER 401 can introduce significant phase error, causing unacceptable degradation in performance. Likewise, if both co-channels use pilot symbols (with both use the same scrambling sequence for the pilot blocks 405), the pilot blocks 405 will be scrambled exactly the same way such that the coherent contribution of the pilot block in the interfering carrier (or co-channel) is still problematic.

To mitigate the effect of co-channel interference, the frame 400 is scrambled, in pilot mode. In general, in this mode, only the non-header portion 407 is scrambled. However, in a broadcast mode, the entire frame 400, including the pilot block 405, is scrambled using a common code; e.g., all the modems 105 are supplied with the same Gold sequence. The scrambling process is further explained with respect to FIGS. 5A, 5B, 8 and 9. As used herein, the scrambled pilot sequence is also denoted as a "pilot-segment" of the frame 400. Further, although the frame 400 exhibits a structure for an 8PSK-modulated frame, when transmitting in the long-frame mode (e.g., 64800 data bits/frame), a QPSK-modulated frame can contain 22 pilot-segments.

Figure 4B:
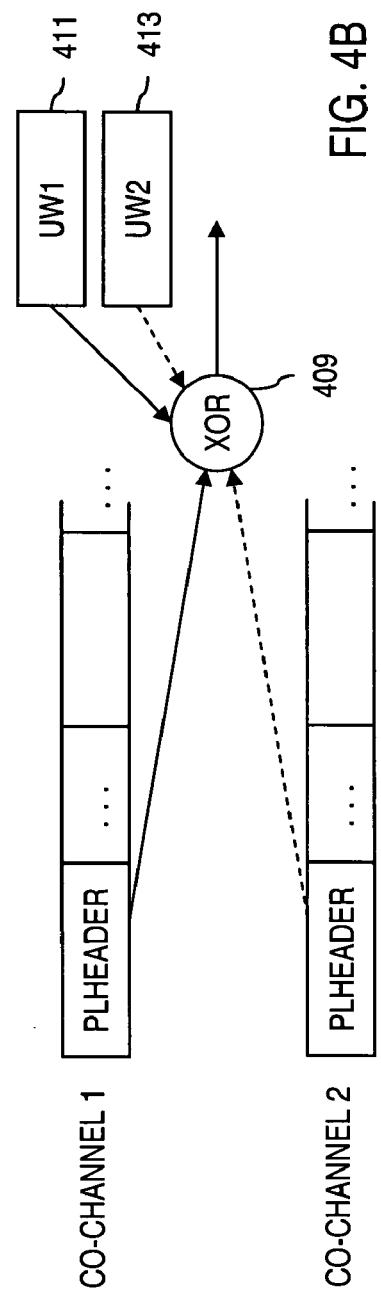

As seen in FIG. 4B, to further reduce the impact of co-channel interference, several different Unique Word (UW) patterns of the same length as the PLHEADER 401 can be utilized for the respective co-channels to scramble the headers 401. For example, an eXclusive-OR (via an XOR logic 409) of the different UW patterns 411, 413 with the PLHEADER 401 can be performed for the desired and interfering carriers (i.e., co-channels). Under this approach, power associated with the PLHEADER 401 of the interfering carrier no longer adds coherently to the PLHEADER 401 of the desired carrier.

Although the frame 400 is described with respect to a structure that supports satellite broadcasting and interactive services (and compliant with the Digital Video Broadcast (DVB)-S2 standard), it is recognized that the carrier synchronization techniques of the present invention can be applied to other frame structures.

Figure 5A:
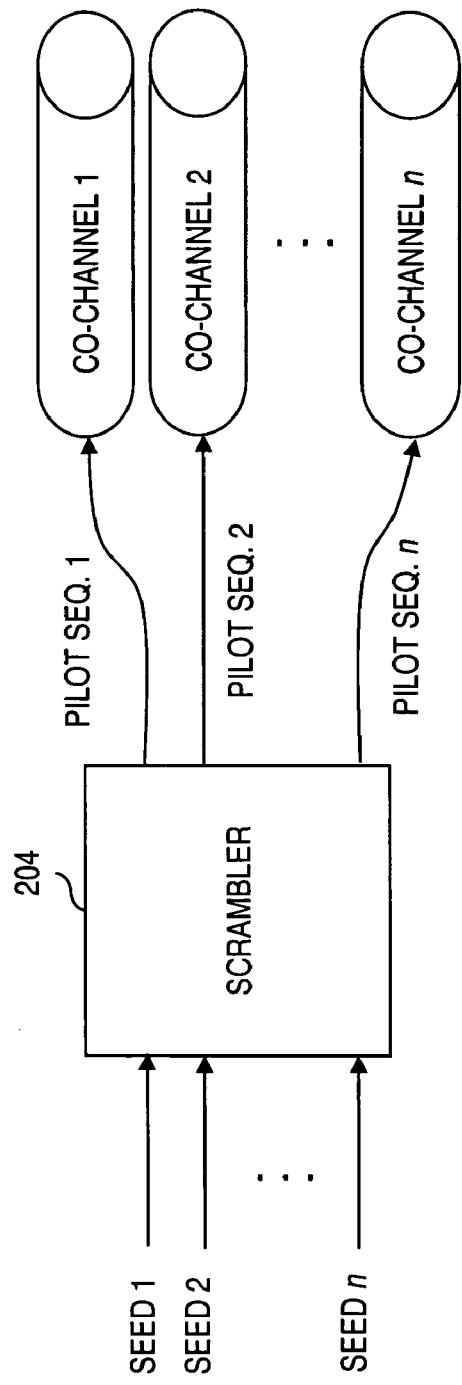
FIGS. 5A and 5B are, respectively, a diagram of a scrambler for isolating co-channel interference and a diagram of a Gold sequence generator for outputting Gold codes used to construct scrambling codes, according to various embodiments of the present invention.

FIG. 5A is a diagram of a scrambler for isolating co-channel interference, according to an embodiment of the present invention. A scrambling code is a complex sequence that can be constructed from a Gold code, according to one embodiment of the present invention. That is, a scrambler 209 generates a scrambling sequence Rn(i). Table 1 defines how the scrambling sequence Rn(i) scrambles the frame using the scrambler 209, according to the scrambler logic of FIG. 7. In particular, Table 1 shows the mapping of an input symbol to an output symbol based on the output of the scrambler 209.

TABLE 1

| Rn(i) | Input(i) | Output(i) |
|---|---|---|
| 0 | I + jQ | I + jQ |
| 1 | I + jQ | −Q + jI |
| 2 | I + jQ | −I − jQ |
| 3 | I + jQ | Q − jI |

Different Gold sequences can be generated by using different seeds for either of the two m-sequence generators. By using different seeds for different services, the mutual interference can be reduced.

In a broadcast mode, the 90 symbol physical layer header 401 can remain constant for a particular physical channel. The Gold sequence is reset at the beginning of each frame, and thus, the scrambled pilots are periodical as well with a period equal to the frame length. Because the information carrying data in a frame varies and appears to be random, the co-channel interference is random and degrades the operating signal-to-noise ratio. However, due to the nature of time-invariance of the physical layer header 401 and the pilot block 405, the carrier and phase estimation is skewed for a receiver depending on these pilots and physical layer header for such acquisition and tracking. This will degrade the performance beyond those of signal-to-noise ratio degradation associated with random data.

The scrambler 209 utilizes different scrambling sequences (n in number) to further isolate the co-channel interference. Each scrambling sequence, or pilot sequence, corresponds to a different seed n. By way of example, 17 possible configurations are provided, as shown in Table 2 below. In each configuration, one scrambling sequence is provided for the physical layer header and one for the pilots. Different pilots are specified in terms of different seed of the Gold sequences.

Figure 5B:
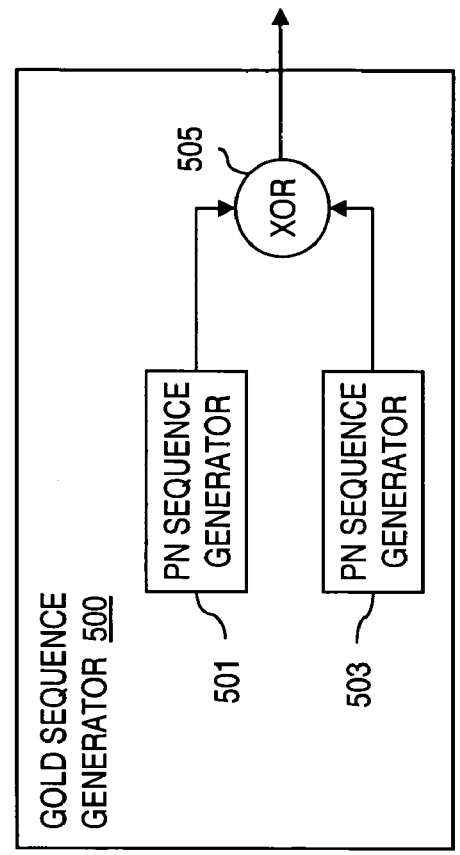
Figure 7:
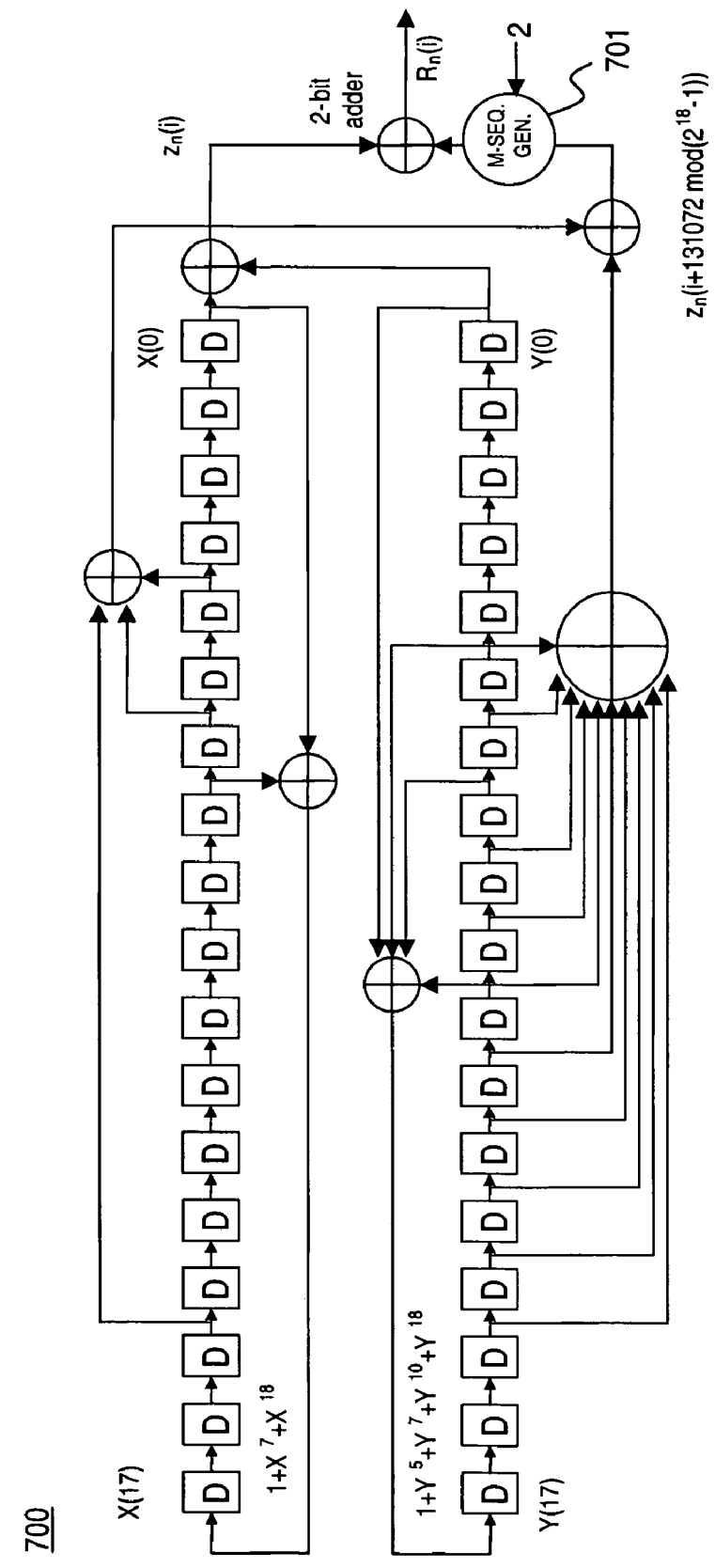
FIG. 7 is a diagram of an exemplary Gold sequence generator used in the scrambler of FIG. 6.

FIG. 5B provides a diagram of a Gold sequence generator for outputting Gold codes used to construct scrambling codes, in accordance with an embodiment of the present invention. As shown, a Gold Sequence Generator 500 employs two Pseudo-Noise (PN) Sequence Generators 501, 503 to generate a "preferred pair" of sequences. The "preferred pair" can be specified by "preferred polynomials" (as seen in the scrambler of FIG. 7). The outputs of these PN Sequence Generators 501, 503 are fed to an XOR logic 505, which performs an Exclusive-OR function on the output sequences to produce a Gold sequence. The Gold Sequence Generator 500 generates Gold sequences from a large class of sequences that exhibit good periodic cross-correlation properties. The Gold sequences are defined using a specified pair of sequences u and v, of period $N=2^n-1$; such a pair is termed a "preferred pair." The set G(u, v) of Gold sequences is defined as follows:

$$G(u,v)=\{u,v,u \oplus v, u \oplus Tv, u \oplus T^2v, \ldots, u \oplus T^{N-1}v\}, \quad \text{Eq. (1)}$$

where T represents the operator that shifts vectors cyclically to the left by one place, and $\oplus$ represents modulo 2 addition. It is noted that G(u,v) contains N+2 sequences of period N. Gold sequences have the property that the cross-correlation between any two, or between shifted versions of them, assumes one of three values: −t(n), −1, or t(n)−2, where $$t(n) = \begin{cases} 1 + 2^{(n+1)/2} & n \text{ even} \\ 1 + 2^{(n+2)/2} & n \text{ odd} \end{cases} \quad \text{Eq. (2)}$$

Turning back to the scrambler 209, in operation, different seed or physical layer sequences are used for "adjacent co-channel." The scrambling mechanism of the scrambler 209 advantageously reduces the signaling by associating one by one between the physical layer signaling and the different seeds representing different Gold sequences. Table 2 enumerates the selection of the scrambling sequence for the physical layer header, in octal format.

TABLE 2

| |
|---|
| 000000000000000000000000000000 |
| 017441442073372365611356321532 |
| 265426356443536276670211411740 |
| 252227554465164204771634274377 |
| 776172163477102134531155722252 |
| 723677114643600327625322063065 |
| 530630226523726003613144773627 |
| 414501457322433557672435620361 |
| 436023561273755661226751405141 |
| 152764667421361462275664347537 |
| 765716133572231436421733137254 |
| 475506033002140572621247123361 |
| 436624712423275014200660305571 |
| 546402134245534407404410536306 |
| 306365041101701165512164201315 |
| 417456000231306236305251032641 |
| 413260452506362306462000351741 |

Data is assumed to be independent in the co-channels. Therefore, the co-channel interference consists only of terms corresponding to the cross-correlation between the pilot-segments of the channels. The data of one channel and pilot-segment on the other channel are also uncorrelated. Depending on the extent of overlap, the correlation may be complete or partial. The correlation $C_{XY}(n)$ of the pilot-segments x(n) and y(n) is expressed in Equation 3, where the sum is over the number of overlapping symbols.

$$C_{XY}(n) = \frac{1}{36}\sum_{k} x(k)y*(k-n) \qquad \text{Eq. (3)}$$

Figure 6:
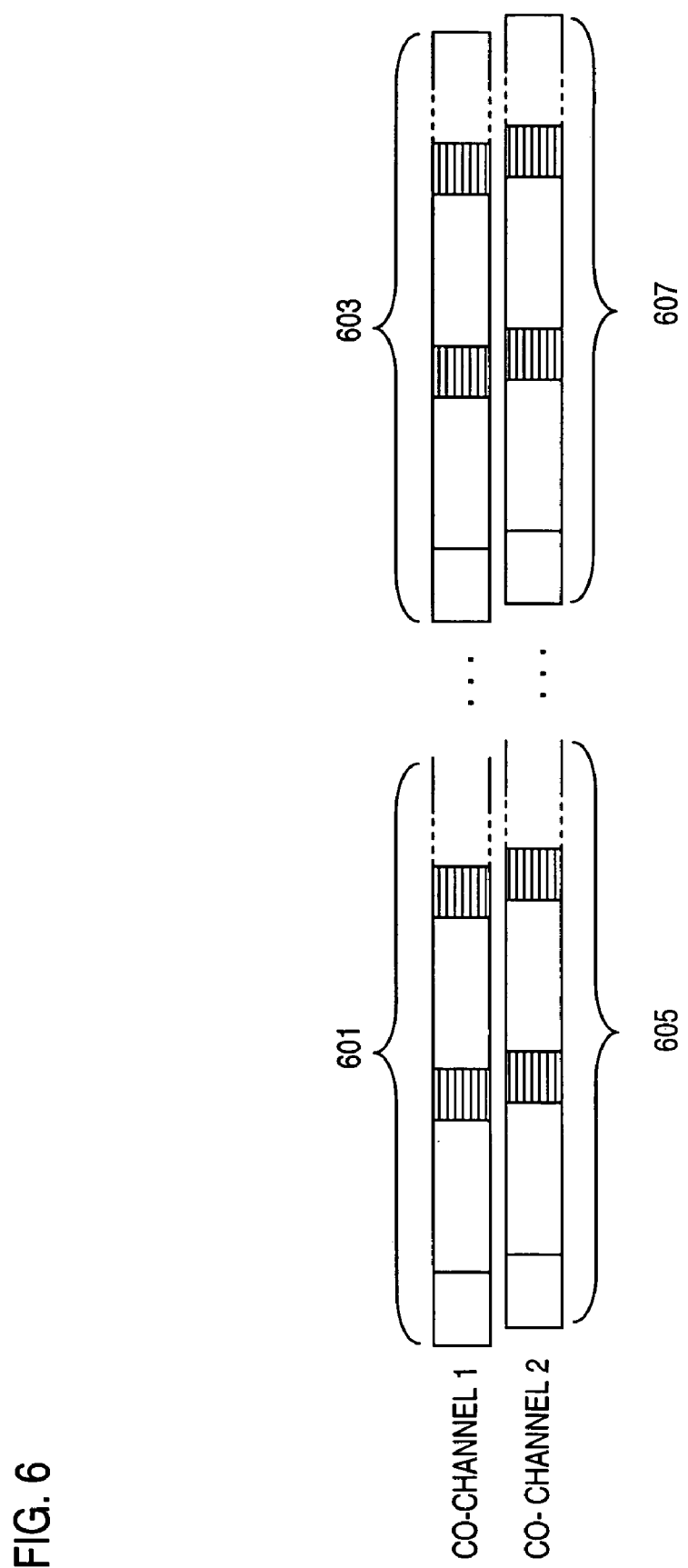
FIG. 6 is a diagram showing the periodic nature of the cross-correlation between co-channel frames, in accordance with an embodiment of the present invention.

Furthermore, it is important to note that these cross-correlations are periodic in nature; that is, they recur at the frame rate. As shown in FIG. 6, frames 601, 603 associated with co-channel 1 are simply shifted with respect to frames 605, 607 of co-channel 2.

If the co-channels use the same seed and are aligned perfectly (with aligned frame boundaries), then the cross-correlation of their pilot segments yields the following:

$$C_{XY}(0) = A_x A_y e^{j\phi}, \qquad \text{Eq. (4)}$$

where, $A_x$ and $A_y$ are the magnitudes of vectors x(k) and y(k), respectively and $\phi$ is the phase difference between the vectors x(k) and y(k). This correlation has the effect of rotating the desired user's signal, thereby causing severe interference.

FIG. 7 is a diagram of an exemplary Gold sequence generator used in the scrambler of FIG. 6. By using different Gold sequences for the co-channels, i.e., different initialization seeds for each of the co-channels, the interference can be mitigated. In this example, a Gold sequence generator 700 employs the preferred polynomials of $1+X^7+X^{18}$ and $1+Y^5+Y^7+Y^{10}+Y^{18}$. Continuing with the example of FIG. 5, to sustain 17 co-channels, in an exemplary embodiment of the present invention, the seeds in Tables 3 and 4 can be programmed into an m-sequence generator 701. The polynomials are initialized as follows: X(0)=1, and X(1)=X(2)=...X(17)=0; and Y(0)=Y(1)=X(2)=...X(17)=1. The Gold code sequence numbers "n" corresponding to the initialization are also listed in Table 3.

The seeds are generated, according to one embodiment of the present invention, using a sub-optimal search algorithm that minimizes the worst cross-correlation between every pair of the co-channel pilot-segments.

TABLE 3

| Co-channel # | Seed X Decimal | Seed X Hex | Sequence # (n) |
|---|---|---|---|
| 1 | 1 | 00001 | 0 |
| 2 | 42348 | 0A56C | 189063 |
| 3 | 55204 | 0D7A4 | 153751 |
| 4 | 57415 | 0E047 | 238776 |
| 5 | 74129 | 12191 | 62994 |
| 6 | 88022 | 157D6 | 95552 |
| 7 | 111487 | 1B37F | 2553 |
| 8 | 112625 | 1B7F1 | 227369 |
| 9 | 123876 | 1E3E4 | 26392 |
| 10 | 137205 | 217F5 | 214455 |
| 11 | 145515 | 2386B | 51921 |
| 12 | 151841 | 25121 | 208647 |
| 13 | 166238 | 2895E | 27314 |
| 14 | 174767 | 2AAAF | 104754 |
| 15 | 183101 | 2CB3D | 76683 |
| 16 | 186848 | 2D9E0 | 146239 |
| 17 | 188914 | 2E1F2 | 96364 |

TABLE 4

| Co-channel # | Seed X Decimal | Seed X Hex |
|---|---|---|
| 1 | 13 | 0000D |
| 2 | 53 | 00035 |
| 3 | 70 | 00046 |
| 4 | 74 | 0004A |
| 5 | 126 | 0007E |
| 6 | 159 | 0009F |
| 7 | 179 | 000B3 |
| 8 | 216 | 000D8 |
| 9 | 236 | 000EC |
| 10 | 238 | 000EE |
| 11 | 244 | 000F4 |
| 12 | 262 | 00106 |
| 13 | 278 | 00116 |
| 14 | 536 | 00218 |
| 15 | 628 | 00274 |
| 16 | 737 | 002E1 |
| 17 | 771 | 00303 |

The worst case correlations between any two of the listed co-channels of Tables 3 and 4 are given in FIGS. 13 and 14, respectively. The maximum cross-correlation is seen in FIG. 13 to be −2.78 dB (highlighted in bold font). For FIG. 14, this maximum cross-correlation occurs at −2.92 dB. It is observed that, although the Gold sequences themselves have good cross-correlation properties, the pilot-segments can exhibit poor cross-correlation characteristics. This is due to the fact that the segments are only 36-symbols long and the seed-selection procedure is constrained by the worst cross-correlation.

Figure 8:
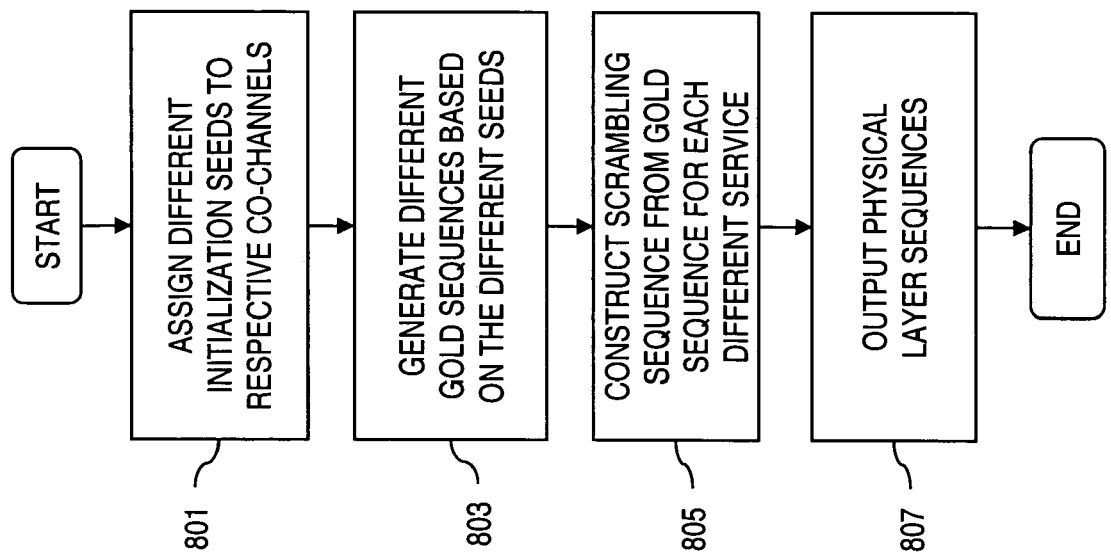
FIG. 8 is a flowchart of a process for generating different physical layer sequences, according to an embodiment of the present invention.
Figure 9:
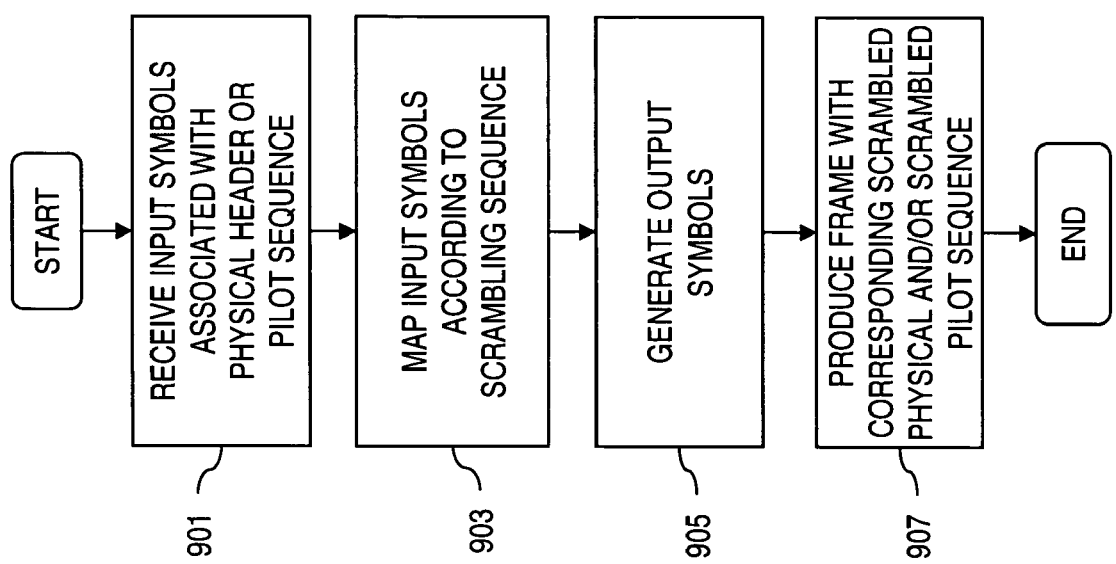
FIG. 9 is a flowchart of process for generating scrambled physical headers, according to an embodiment of the present invention.

The scrambling process is now further explained in FIGS. 8 and 9.

FIG. 8 is a flowchart of a process for generating different physical layer sequences, according to an embodiment of the present invention. In step 801, different initialization seeds are assigned to the respective co-channels. Next, Gold sequences are generated based on the seeds, per step 803. A scrambling sequence is then constructed, as in step 805, from the Gold sequence for each different service. In step 807, the physical layer sequences are output by the scrambler 209 (FIG. 2).

FIG. 9 is a flowchart of process for generating scrambled physical headers, according to an embodiment of the present invention. The transmitter 200 (of FIG. 2) receives input symbols associated with the physical header or pilot sequence, as in step 901. In step 903, the transmitter maps the input symbols according to a scrambling sequence generated by the scrambler 209. The output symbols are then generated, per step 905. Thereafter, the transmitter outputs a frame with a scrambled physical and/or scrambled pilot sequence (step 907).

Figure 10:
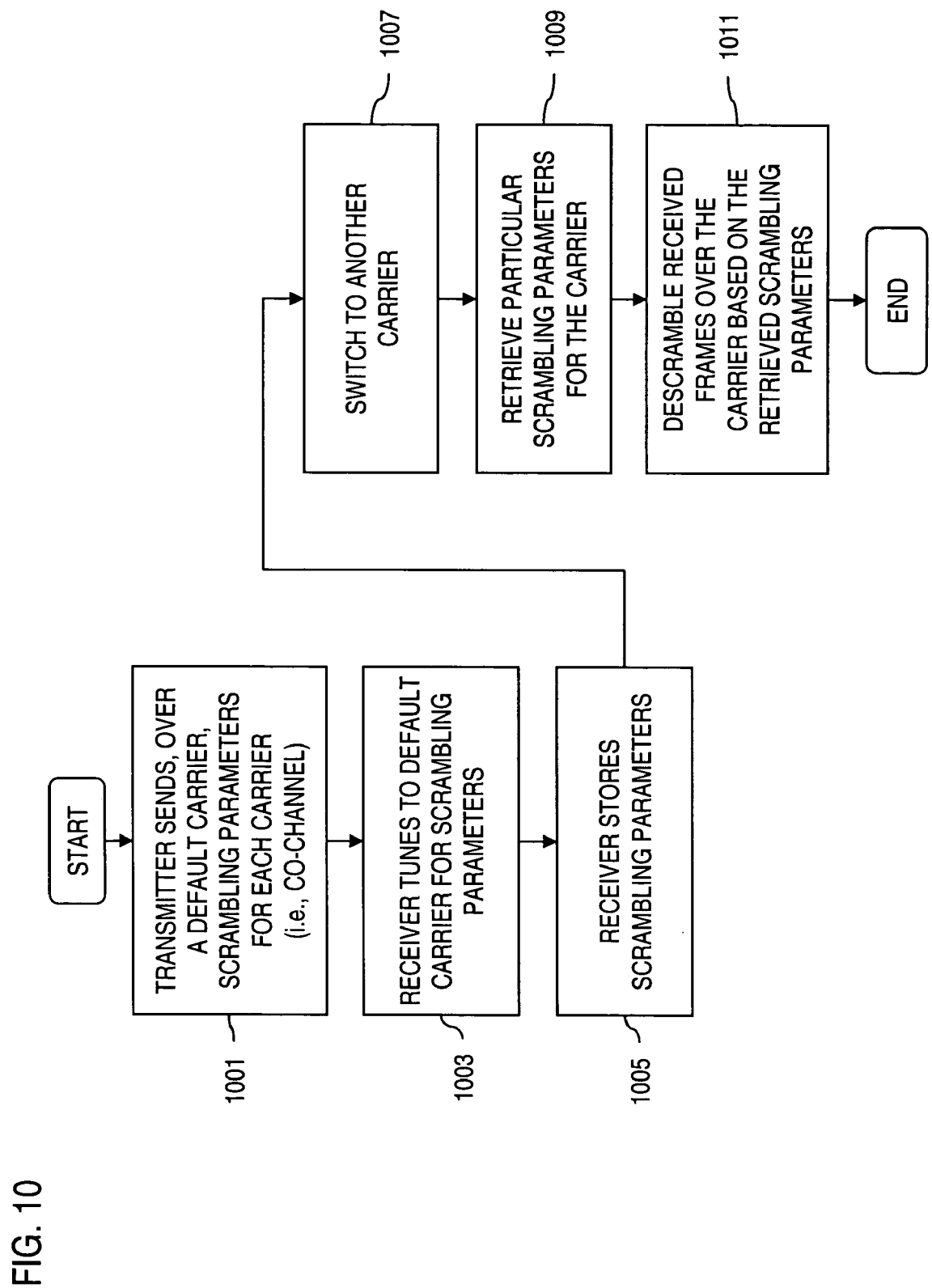
FIG. 10 is a flowchart of process for transmitting scrambling parameters, according to an embodiment of the present invention.

FIG. 10 is a flowchart of process for transmitting scrambling parameters, according to an embodiment of the present invention. As discussed above, for the pilot mode, different Gold sequences are employed for different services to reduce co-channel interference. In addition, use of different UW patterns of the same length as the header 401 can minimize coherent addition of the headers 401. Consequently, a receiver needs the appropriate UW to unscramble the PLHEADER, as well as the appropriate Gold sequence to unscramble the payload data and the pilot block.

In step 1001, the transmitter (e.g., transmitter 200) sends, over a default carrier, scrambling parameters for each of the supported carriers, or co-channels. According to one embodiment of the present invention, the scrambling parameters include an index of the UW, and the scrambling sequence number for each carrier. The default carrier supports a frame whose PLHEADER is not scrambled and the payload data (and pilot block if any) are scrambled by a default Gold sequence, e.g., Sequence No. 0. The receiver, as in step 1003, initially tunes to this carrier to obtain the scrambling parameters (e.g., UW indices and Gold sequence numbers), and stores the scrambling parameter sets for all carriers to be received (per step 1005). When the receiver switches to another carrier, as in step 1007, the particular scrambling parameters for the carrier are retrieved, per step 1009. In particular, the stored index is retrieved to find the correct UW as well as the stored Gold sequence number. In step 1011, the frames received over the particular carrier are descrambled appropriately.

Figure 11:
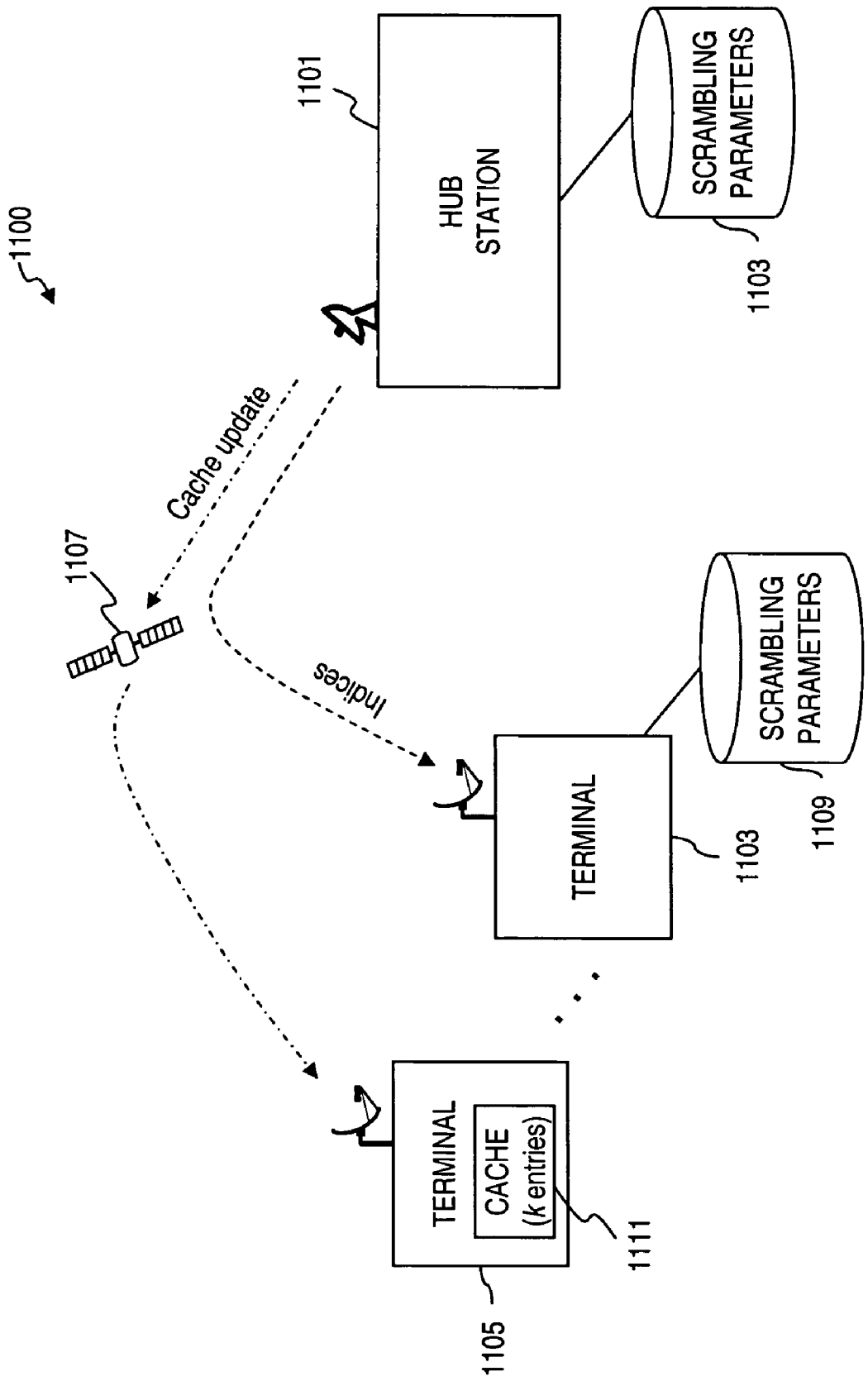
FIG. 11 is a diagram showing various embodiments of the present invention for managing scrambling parameters.

FIG. 11 is a diagram showing various embodiments of the present invention for managing scrambling parameters. In this example, a satellite system 1100 includes a hub station 1101 that stores the scrambling parameters in external memory, i.e., a database 1103, for all carriers utilized in the system 1100. The scrambling parameters can be conveyed to satellite terminals 1103, 1105 via a satellite 1107 using two approaches.

Under the first approach, the terminal 1103 maintains all sets of scrambling parameters that correspond to the carriers that is assigned to the terminal 1103. In this manner, the hub station 1101 need only indicate the particular entry associated with the proper set of scrambling parameters for the terminal 1103 to use for a particular carrier. An update command only indicates the indices for these UW and Gold sequence number in the database 1109 of the terminal 1103.

Figure 12:
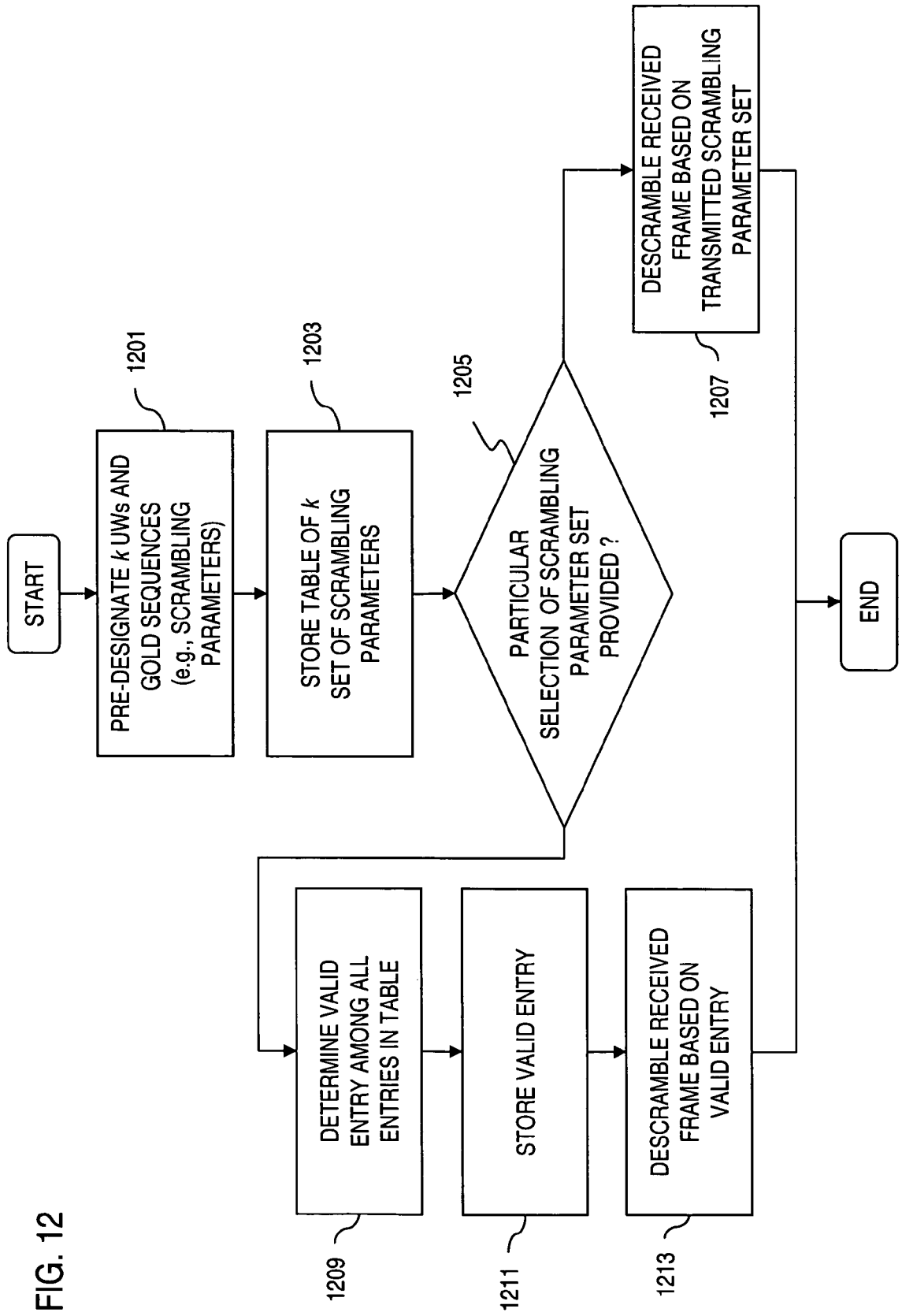
FIG. 12 is a flowchart for descrambling received frames based on pre-designated sets of scrambling parameters, according to an embodiment of the present invention.

The second approach employs a caching mechanism for pre-selected or pre-designated scrambling parameter entries, as explained in FIG. 12. As such, the terminal 1105 includes a cache 1111 to store the pre-designated set of parameters.

FIG. 12 is a flowchart for descrambling received frames based on pre-designated sets of scrambling parameters, according to an embodiment of the present invention. With this approach, k sets of scrambling parameters corresponding to the carriers to be used by the terminal 1105 are pre-selected or pre-designated, as in step 1201. In other words, only k pre-selected UWs and k Gold sequence numbers in a table. The value of k can be configured according to the size of the cache 1111. As a result, the hub station 1101 need only transmit $2\log_2 k$ bits for each carrier. Further, if a fixed association between UW and Gold sequence number is maintained, the number of transmitted bits can be further reduced—one $\log_2 k$ bit number for each carrier. The terminal 1105, thus, stores only k sets of scrambling parameters in the cache 1111, per step 1203.

With this "cache" concept, the terminal 1105 need not be instructed as to a particular set of scrambling parameter by the hub station 1101. At this point, if the terminal 1105 determines that the hub station 1101 has indicated such instruction, per step 1205, the terminal 1105 retrieves the appropriate scrambling parameter from the cache 1111 and descrambles frames received over the specific carrier, as in step 1207.

Alternatively, the terminal 1105 can, itself, determine a valid entry, as in step 1209, in the scrambling parameter table within the cache 1111, assuming that k is sufficiently small as to not overburden the processing capability of the terminal 1105. The terminal 1105 can execute a search procedure to step through all the possible k pre-selected sets of UW and Gold sequence numbers stored in the cache 1111, without receiving these parameters via a default carrier, when the receiver first tunes to a particular carrier. Once the valid or correct set of UW and Gold sequence number is found for a particular carrier after the search, the information can be stored, per step 1211, in the cache 1111 for this carrier. This information is then utilized to descramble the frame (step 1213). Consequently, this valid set of scrambling parameters is used in the future without further search when needed.

Under the above approach, great flexibility is afforded to how the scrambling parameters are conveyed to the terminal 1105. The hub station 11 can update the limited k UW and Gold sequence number sets through over-the-air programming. While there are k internal sets of UW and Gold sequence numbers stored in the cache 1111 of the terminal 1105, each of the sets can be replaced under remote command by the hub station 1101 with a new UW and Gold sequence number. For example, in a cache update over-the-air, a full length of the UW, and the Gold sequence number (e.g., 18-bits) along with the index is transmitted.

The processes of FIGS. 8–10 and 12 advantageously provide reduced co-channel interference, thereby enhancing receiver performance. These processes can be implemented as software and/or hardware, as explained in FIG. 15.

Figure 15:
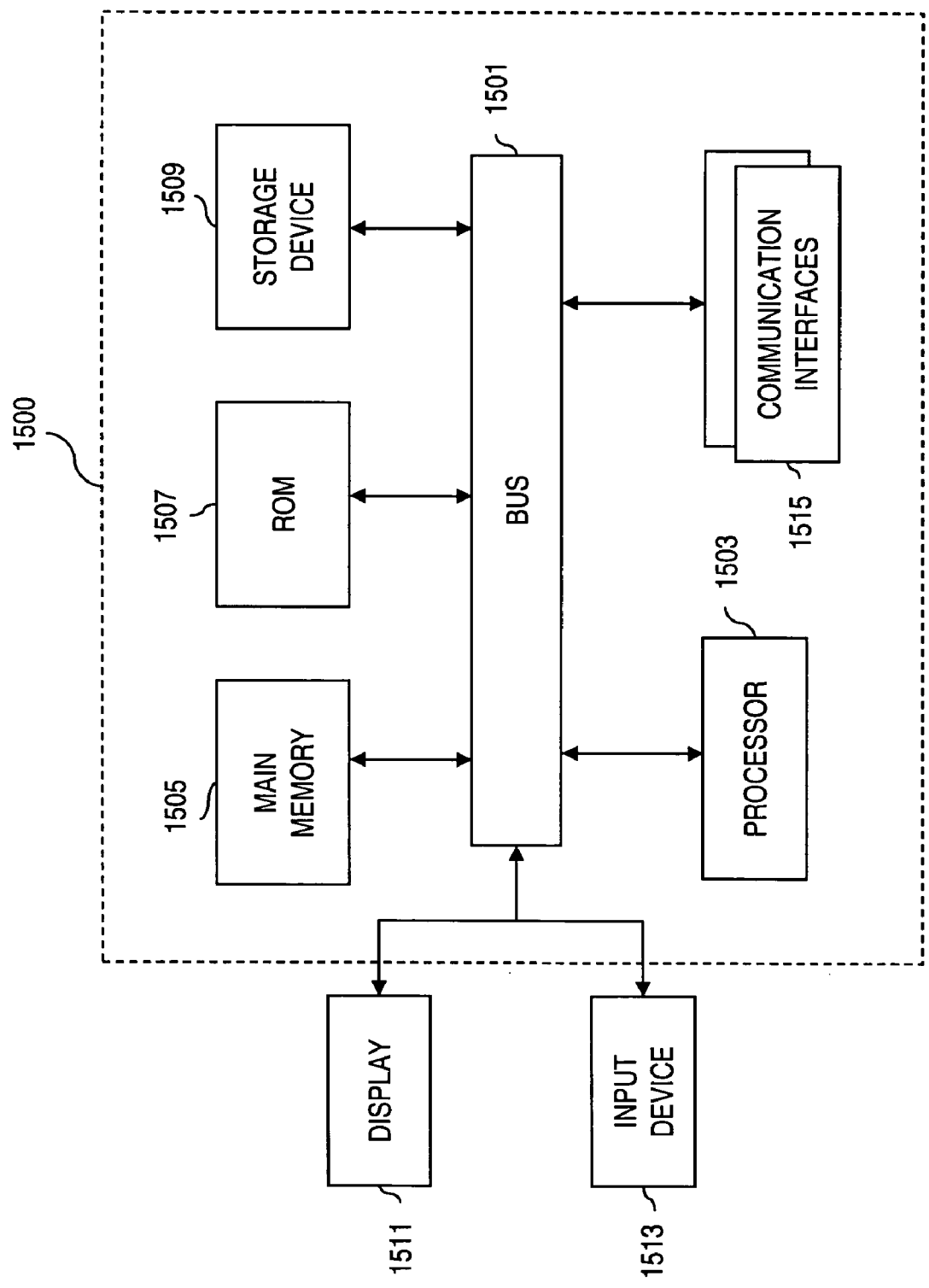
FIG. 15 is a diagram of a hardware platform that can perform the various processes for isolating co-channel interference, in accordance with embodiments of the present invention.

FIG. 15 illustrates exemplary hardware upon which an embodiment according to the present invention can be implemented. A computing system 1500 includes a bus 1501 or other communication mechanism for communicating information and a processor 1503 coupled to the bus 1501 for processing information. The computing system 1500 also includes main memory 1505, such as a random access memory (RAM) or other dynamic storage device, coupled to the bus 1501 for storing information and instructions to be executed by the processor 1503. Main memory 1505 can also be used for storing temporary variables or other intermediate information during execution of instructions by the processor 1503. The computing system 1500 may further include a read only memory (ROM) 1507 or other static storage device coupled to the bus 1501 for storing static information and instructions for the processor 1503. A storage device 1509, such as a magnetic disk or optical disk, is coupled to the bus 1501 for persistently storing information and instructions.

The computing system 1500 may be coupled via the bus 1501 to a display 1511, such as a liquid crystal display, or an active matrix display, for displaying information to a user. An input device 1513, such as a keyboard including alphanumeric and other keys, may be coupled to the bus 1501 for communicating information and command selections to the processor 1503. The input device 1513 can include a cursor control, such as a mouse, a trackball, or cursor direction keys, for communicating direction information and command selections to the processor 1503 and for controlling cursor movement on the display 1511.

According to one embodiment of the invention, the processes of FIGS. 8–10 and 12 can be provided by the computing system 1500 in response to the processor 1503 executing an arrangement of instructions contained in main memory 1505. Such instructions can be read into main memory 1505 from another computer-readable medium, such as the storage device 1509. Execution of the arrangement of instructions contained in main memory 1505 causes the processor 1503 to perform the process steps described herein. One or more processors in a multi-processing arrangement may also be employed to execute the instructions contained in main memory 1505. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computing system 1500 also includes at least one communication interface 1515 coupled to bus 1501. The communication interface 1515 provides a two-way data communication coupling to a network link (not shown). The communication interface 1515 sends and receives electrical, electromagnetic, or optical signals that carry digital data streams representing various types of information. Further, the communication interface 1515 can include peripheral interface devices, such as a Universal Serial Bus (USB) interface, a PCMCIA (Personal Computer Memory Card International Association) interface, etc.

The processor 1503 may execute code that is being received over the communication interface 1515 and/or store the code in the storage device 1509, or other non-volatile storage for later execution. In this manner, the computing system 1500 may obtain application code in the form of a carrier wave.

The term "computer-readable medium" as used herein refers to any medium that participates in providing instructions to the processor 1503 for execution. Such a medium may take many forms, including but not limited to non-volatile media, volatile media, and transmission media. Non-volatile media include, for example, optical or magnetic disks, such as the storage device 1509. Volatile media include dynamic memory, such as main memory 1505. Transmission media include coaxial cables, copper wire and fiber optics, including the wires that comprise the bus 1501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, the various embodiments of the present invention provide an approach for minimizing co-channel interference in a digital broadcast and interactive system. It is recognized that the cross-correlations between co-channel frames are periodic in nature. A header of a first frame is scrambled based on a first unique word (UW). A header of a second frame is scrambled based on a second unique word. The first frame including the corresponding scrambled header and the second frame including the corresponding scrambled header are transmitted, respectively, over adjacent co-channels of the communication system. Each of the frames further includes a payload and a pilot block. The payload and the pilot block of the first frame are scrambled based on a first scrambling sequence. The payload and the pilot block of the second frame are scrambled based on a second scrambling sequence. Information associated with the unique words and the scrambling sequences are transmitted over a default carrier to a receiver within the communication system. The scrambling sequences, according to one embodiment of the present invention, are based on Gold sequences. The above arrangement advantageously reduces the impact of co-channel interference, thereby enhancing receiver performance.

While the present invention has been described in connection with a number of embodiments and implementations, the present invention is not so limited but covers various obvious modifications and equivalent arrangements, which fall within the purview of the appended claims.

What is claimed is:

1. A method for minimizing co-channel interference in a communication system, the method comprising the steps of:
    scrambling a header of a first frame based on a first unique word;
    scrambling a payload and a pilot block of the first frame based on a first scrambling sequence;
    scrambling a header of a second frame based on a second unique word; and
    scrambling a payload and a pilot block of the second frame based on a second scrambling sequence,
    wherein the first frame including the corresponding scrambled header and the second frame including the corresponding scrambled header are transmitted, respectively, over adjacent co-channels of the communication system.

2. A method according to claim 1, further comprising the step of:
    transmitting information associated with the unique words and the scrambling sequences over a default carrier to a receiver within the communication system.

3. A method according to claim 1, further comprising the step of:
    generating a plurality of sets of unique words and scrambling sequences corresponding to carriers supported by the communication system.

4. A method according to claim 3, wherein the quantity of sets is a predetermined value.

5. A method according to claim 4, wherein a portion of the sets are stored at a receiver, the method further comprising the step of:
    instructing the receiver about which of the stored sets to use.

6. A method according to claim 4, wherein a portion of the sets are stored at a receiver, and the receiver determines a valid set for a particular carrier from the stored sets.

7. A method according to claim 1, wherein the sets are stored in a database coupled to a receiver, and the receiver includes a cache configured to store a portion of the sets.

8. A method according to claim 7, wherein a portion of the sets are stored at a receiver, the method further comprising the step of:
   instructing the receiver to update the cache.

9. A method according to claim 1, wherein the scrambling sequences are based on Gold sequences.

10. A method according to claim 1, wherein the communication system includes a satellite supporting digital broadcast and interactive applications.

11. A method according to claim 1, further comprising the step of:
   transmitting each of the frames according to a modulation scheme including one of Binary Phase Shift Keying (BPSK), Quadrature Phase Shift Keying (QPSK), BPSK, 16 Amplitude Phase Shift Keying (APSK), 32APSK, and a high order Quadrature Amplitude Modulation (QAM).

12. A method according to claim 1, wherein each of the frames includes information encoded according to Low Density Parity Check (LDPC) coding.

13. A computer-readable medium bearing instructions for minimizing co-channel interference in a communication system, said instruction, being arranged, upon execution, to cause one or more processors to perform the method of claim 1.

14. An apparatus for minimizing co-channel interference in a communication system, comprising:
   a scrambler configured to scramble a header of a first frame based on a first unique word, and to scramble a header of a second frame based on a second unique word, the scrambler being further configured to scramble a payload and a pilot block of the first frame based on a first scrambling sequence and to scramble a payload and a pilot block of the second frame based on a second scrambling sequence,
   wherein the first frame including the corresponding scrambled header and the second frame including the corresponding scrambled header are transmitted, respectively, over adjacent co-channels of the communication system.

15. An apparatus according to claim 14, wherein information associated with the unique words and the scrambling sequences is transmitted over a default carrier to a receiver within the communication system.

16. An apparatus according to claim 14, wherein the scrambler generates a plurality of sets of unique words and scrambling sequences corresponding to carriers supported by the communication system.

17. An apparatus according to claim 16, wherein the quantity of sets is a predetermined value.

18. An apparatus according to claim 17, wherein a portion of the sets are stored at a receiver, and the receiver is instructed about which of the stored sets to use.

19. An apparatus according to claim 17, wherein a portion of the sets are stored at a receiver, and the receiver determines a valid set for a particular carrier from the stored sets.

20. An apparatus according to claim 14, wherein the sets are stored in a database coupled to a receiver, and the receiver includes a cache configured to store a portion of the sets.

21. An apparatus according to claim 20, wherein a portion of the sets are stored at a receiver, and the receiver is instructed to update the cache.

22. An apparatus according to claim 14, wherein the scrambling sequences are based on Gold sequences.

23. An apparatus according to claim 14, wherein the communication system includes a satellite supporting digital broadcast and interactive applications.

24. An apparatus according to claim 14, further comprising:
   a modulator configured to modulate the frames according to a modulation scheme including one of Binary Phase Shift Keying (BPSK), Quadrature Phase Shift Keying (QPSK), 8PSK, 16 Amplitude Phase Shift Keying (APSK), 32APSK, and a high order Quadrature Amplitude Modulation (QAM).

25. An apparatus according to claim 14, wherein each of the frames includes information encoded according to Low Density Parity Check (LDPC) coding.

26. A method of communicating comprising the steps of:
   tuning to a default carrier to receive scrambling information, wherein the scrambling information includes a unique word and a scrambling sequence corresponding to a particular carrier among a plurality of adjacent carriers, the unique word and the scrambling sequence being selected to minimize co-channel interference with respect to the adjacent carriers;
   tuning to the particular carrier for receiving a scrambled frame including a header, a payload, and a pilot block;
   descrambling the header with the unique word; and
   descrambling the payload and the pilot block with the scrambling sequence.

27. A method according to claim 26, wherein the scrambling information is one of a plurality of sets of scrambling information corresponding to different ones of the adjacent carriers.

28. A method according to claim 27, wherein the quantity of sets is a predetermined value.

29. A method according to claim 27, further comprising:
   receiving a portion of the sets of scrambling information; and
   storing the portion of the sets of scrambling information in a cache.

30. A method according to claim 27, further comprising:
   tuning to another one of the carriers; and
   determining a valid set from the stored sets of scrambling information for the one carrier.

31. A method according to claim 27, further comprising:
   receiving the sets of scrambling information; and
   storing the sets of scrambling information in a database.

32. A method according to claim 31, further comprising:
   storing a portion of the sets of scrambling information in a cache.

33. A method according to claim 32, further comprising:
   receiving a command to update the cache.

34. A method according to claim 26, wherein the scrambling sequences are based on Gold sequences.

35. A method according to claim 26, wherein the communication system includes a satellite supporting digital broadcast and interactive applications.

36. A method according to claim 26, wherein the unique word has a length identical with the header, the scrambled header in the scrambled frame being determined based on an exclusive-OR function with the unique word.

37. A computer-readable medium bearing instructions for communicating in a communication system, said instruction, being arranged, upon execution, to cause one or more processors to perform the method of claim 26.

* * * * *